US008083458B2

(12) United States Patent
Wilkie

(10) Patent No.: US 8,083,458 B2
(45) Date of Patent: Dec. 27, 2011

(54) HOIST SYSTEM FOR FLAT SCREEN TELEVISIONS AND HEAVY OBJECTS

(76) Inventor: Susan J. Wilkie, Palm Coast, FL (US)

( * ) Notice: Subject to any disclaimer, the term of this patent is extended or adjusted under 35 U.S.C. 154(b) by 755 days.

(21) Appl. No.: 11/893,856

(22) Filed: Aug. 17, 2007

(65) Prior Publication Data

US 2009/0047110 A1 Feb. 19, 2009

(51) Int. Cl.
*B65G 47/90* (2006.01)

(52) U.S. Cl. ......................... 414/618; 414/673; 212/195

(58) Field of Classification Search .................. 414/622, 414/444, 453, 618, 621, 673, 719; 254/7 R, 254/2 B; 396/428; 280/35, 47.11, 47.371; 212/195

See application file for complete search history.

(56) References Cited

U.S. PATENT DOCUMENTS

| | | | | |
|---|---|---|---|---|
| 633,850 | A * | 9/1899 | Jonte | 414/687 |
| 1,019,550 | A * | 3/1912 | Stavely | 248/129 |
| 1,126,368 | A | 1/1915 | Boensch | 414/622 |
| 2,156,862 | A * | 5/1939 | Maugard | 248/123.2 |
| 2,250,577 | A | 1/1941 | Ernst | 414/622 |
| 2,539,233 | A | 1/1951 | Dickson | 414/622 |
| 2,620,932 | A | 12/1952 | Alpine | 414/180 |
| 2,687,668 | A * | 8/1954 | La Verne Dupy et al. | 352/69 |
| 2,807,382 | A | 9/1957 | Schenkelberger | 414/620 |
| 2,827,184 | A | 3/1958 | Mueller | 414/420 |
| 2,962,730 | A * | 12/1960 | Carnes et al. | 5/86.1 |
| 3,199,699 | A | 8/1965 | Dayton | 414/622 |
| 3,391,905 | A * | 7/1968 | Burns | 254/7 R |
| 3,455,476 | A | 7/1969 | Grigsby | 414/607 |
| 3,770,152 | A * | 11/1973 | Niemuth | 414/448 |
| 4,025,017 | A | 5/1977 | Miller | 248/297.11 |
| 4,083,459 | A * | 4/1978 | Allen | 212/196 |
| 4,285,626 | A | 8/1981 | Donato | 414/622 |
| 4,394,106 | A | 7/1983 | Frees et al. | 414/622 |
| 4,395,188 | A * | 7/1983 | Kaup | 414/622 |
| 4,579,501 | A * | 4/1986 | Fox | 414/347 |
| 4,722,511 | A * | 2/1988 | Chitwood | 254/7 R |
| 4,849,778 | A * | 7/1989 | Samuelson | 396/428 |

(Continued)

FOREIGN PATENT DOCUMENTS

EP 755896 A2 * 1/1997

*Primary Examiner* — Joshua Rudawitz

(74) *Attorney, Agent, or Firm* — Ernest D. Buff; Ernest D. Buff & Associates; Dave Narasimhan

(57) ABSTRACT

A hoist system hoists a flat screen television or a heavy object in a room for attachment to a wall mounted attachment fixture. The hoist system has a wheel-supported base, and a central pillar with a raising and lowering element. The central pillar has a counter weight projection arm with a plurality of notches for carrying a counterbalance weight. A projection arm extends from the movable element in the direction opposite to the counterbalance weight arm with a downward pointing extension that carries a plurality of adjustable L-shaped brackets. The hoist system is brought close to a television or heavy weight at ground level and the L-shaped brackets are inserted therebelow. Weight balance is checked and a counterweight is placed on an appropriate notch in the counterbalance weight arm. The flat screen television or heavy object is then lifted to the correct height for wall attachment. Even though the load produced by the flat screen television or heavy weight being carried overhangs, delivery thereof to a point closely proximate a wall of a room can be reliably and safely accomplished by a single person.

8 Claims, 3 Drawing Sheets

U.S. PATENT DOCUMENTS

| | | | | |
|---|---|---|---|---|
| 4,881,866 | A | 11/1989 | Harmon | 414/607 |
| 4,902,187 | A | 2/1990 | Rousseau | 414/456 |
| 4,969,789 | A * | 11/1990 | Searle | 414/10 |
| 5,122,027 | A | 6/1992 | Tabayashi | 414/622 |
| 5,184,934 | A | 2/1993 | Gallo | 414/740 |
| 5,344,278 | A * | 9/1994 | Emig, Jr. | 414/622 |
| 5,501,497 | A | 3/1996 | Holloway | 294/86.4 |
| 5,509,774 | A | 4/1996 | Yoo | 414/622 |
| 5,544,860 | A * | 8/1996 | Craig | 254/7 R |
| 5,671,932 | A * | 9/1997 | Chapman | 280/47.11 |
| 6,530,740 | B2 * | 3/2003 | Kim | 414/490 |
| 6,705,773 | B2 * | 3/2004 | Fix | 396/419 |
| 7,037,006 | B2 * | 5/2006 | Chapman | 396/428 |
| 7,544,001 | B2 * | 6/2009 | Chapman | 396/428 |
| 2005/0045077 | A1 | 3/2005 | Bober | 108/147 |
| 2006/0151558 | A1 * | 7/2006 | Higgins | 224/636 |
| 2008/0054238 | A1 * | 3/2008 | Craig et al. | 254/7 R |

* cited by examiner

HOIST SYSTEM FOR FLAT SCREEN TELEVISIONS AND HEAVY OBJECTS

BACKGROUND OF THE INVENTION

1. Field of the Invention

The present invention relates to a hoist system for hoisting heavy objects; and, more particularly to a system for hoisting a flat screen television or a heavy mirror or picture within a room wherein the flat screen television or heavy object is brought into close proximity of the room wall, enabling its attachment to wall brackets and the like by a single person.

2. Description of the Prior Art

Many patents address issues related to lifting heavy weights in an industrial environment using fork lift trucks. In these devices, the heavy weight of the truck balances the weight of the object being lifted and the weight of the object lifted is inherently less that that of the weight of the fork lift truck body Several prior art patents address lifting mechanisms for televisions; but the devices disclosed by these patents are either already attached to a wall or place the television too far away from the wall. Consequently, in use of such devices, a flat screen television could not be readily hung on a wall by a single person.

U.S. Pat. No. 1,126,368 to Boensch et al. discloses a warehouse truck for handling rolls of paper. A hinged arm is lowered or raised by pulling on a flexible cable. Since the arm swings in a circular motion, its distance from, for example, a stationary wall changes as a function of height lifted, preventing an object from being brought into close proximity with a vertical wall. The weight is not lifted in a vertical plane. This light weight handling device is designed for lifting rolls of paper, not heavy weights.

U.S. Pat. No. 2,250,577 to Ernst discloses a container handling device for handling heavy barrels, bails and the like. A fork engages the bottom of a drum. The top of the drum is engaged by a gripping mechanism, and the drum is tiled and lifted above ground level to effect transport thereof. Since the object to be lifted is tilted, it is not lifted vertically.

U.S. Pat. No. 2,539,233 to Dickson discloses a lift truck and attachment therefor. Like the device taught by the '577 patent, a fork engages the bottom of a drum. The top of the drum is engaged by a gripping mechanism, and the drum is tiled when lifted above ground level to transport the drum. Since the object to be lifted is tilted, it is not lifted vertically.

U.S. Pat. No. 2,620,932 to Alpine discloses a kiln truck. This kiln truck is slid into the bottom of a kiln. An elevator frame is slid under ceramic ware within the kiln, and is lifted by a hydraulic cylinder. The purpose of this lifting is only to raise the ceramic ware off the floor of the kiln; and the load is not lifted to a substantial height. Since the front wheels kiln truck extend beyond the lifted load, the load cannot be brought close to a wall.

U.S. Pat. No. 2,807,382 to Schenkelberger discloses an industrial lift truck with a load clamp. The load is clamped by a plurality of telescoping means. The industrial fork lift is not well suited for use within the interior of a residential dwelling. The weight of the truck is used to balance the lifted load. Consequently, the load lifted must be significantly lower than the weight of the truck.

U.S. Pat. No. 2,827,184 to Mueller discloses a drum handling attachment for a fork lift. The attachment is designed solely to handle cylindrical containers. The lifting device relies on the attachment of the two tubes to be fitted into a fork lift, which constitutes heavy machinery unsuitable for use in a residential dwelling.

U.S. Pat. No. 3,199,699 to Dayton discloses a load carrying mechanism for a lift truck. A shift frame is supported on an elevating structure of a vehicle. Pivotally supported on the shift frame is a pivot frame, which provides support on the vertical axis pivot means for lateral pivotal movement. The pivot frame carries a plurality of load-engaging clamps. A lifting mechanism is mounted on the front of the truck. The weight of the load carried is balanced by the weight of the truck. The lift mechanism is not suited for lifting a flat screen television or heavy load within a residential dwelling.

U.S. Pat. No. 3,455,476 to Grigsby discloses an attachment for a lift truck. This attachment is adapted for handling crates of glass even when the crates rest directly on the floor surface against a wall or are stacked against each other. A load engaging foot is mounted on the lower end of the truck, and a telescoping clamping arm reciprocapable on a mask clamps the load. Movement of the foot member beneath the load is made possible by the relative sliding movement of the inner claw with respect to the support arm. The outer claw is engaged and the load is shifted rearwardly to a position above the front wheels of the truck. An attachment on the truck has a mast with a bottom support. A load clamping arm is used to secure and lift the load. The attachment is fixed to the truck. A bottom support and a movable arm of the attachment clamp the load. The clamped load is then lifted. Clearly, this heavy industrial weight truck is not well suited for use in a residential dwelling.

U.S. Pat. No. 4,025,017 to Miller discloses a wall mounted lift for a television receiver or the like. A spring-loaded hoist mountable vertically on a wall is provided for use particularly in mounting a heavy television receiver to a wall and raising it to an elevated position. The hoist includes a fixed housing, which is attached permanently to the vertical wall of a room and is formed with a vertical guide channel. A movable carriage is mounted within the housing for vertical reciprocation along the guide channel and is urged upwardly by means of a constant force spring reel assembly mounted in the top of the housing and connected to the carriage. The carriage includes a locking mechanism adapted to engage the housing for locking the carriage in a lowered position and also includes a connecting member adapted to engage a cooperating connecting member of a television by means of which the carriage, when unlocked and supporting a television, may be raised or lowered with little physical effort. This wall mounted lift has an elongated housing that is screwed or bolted to the wall and carries a movable carriage. A television receiver is reeled to the movable carriage using a cart. When the cart is in its lowest position, the television receiver is secured to the movable carriage by lockable pins. The housing is permanently present on the wall and is unsightly. The television is not lifted to or attached to a fixed or a swinging wall bracket.

U.S. Pat. No. 4,285,626 to Donato discloses a fork lift truck with plate glass handling attachment. A fork lift truck is equipped with an attachment or fixture for handling a plate glass load. The truck is also equipped with a control system, which includes a sensing switch for automatically controlling the operation of the truck. The control system also includes a release switch for preventing the truck from backing up, following deposit of a plate glass item at a storage area, until the plate glass load fixture has cleared the plate glass item. This glass plate lifting attachment is secured to a truck and carries glass in a slightly inclined orientation. It does not suggest or disclose a mechanism for lifting a flat screen television or heavy weight with a room of a house.

U.S. Pat. No. 4,394,106 to Frees et al. discloses a glass handling lift truck. A lift truck mechanism handles glass sheets having a glass pack lifting frame. Gripping devices at the sides of the lifting frame engage sides of a glass pack. Feet at the bottom of the lifting frame support the glass pack on the frame. A framework of the mechanism attaches it to the lift mast of the lift truck. An operator control station platform extends rearwardly from the lifting frame above the lift mast. An intermediate frame is carried by the framework in selectively extendable relationship in front of the mast. A first pair of swinging frames is swingably affixed to the intermediate frame for swinging movement on an upright axes at the opposite sides of the intermediate frame. A second pair of swinging frames is swingably affixed at proximal ends to the distal ends of the first pair of frames. Distal ends of the second pair of frames are pivoted to the lifting frame. A drag link interconnects the distal ends of the first pair of frames. First and second sets of hydraulic cylinders, respectively, effect side-shifting and slewing movements of the lifting frame relative to the lift truck. A front portion of the truck designed for handling glass sheets in a nearly vertical orientation, protects the driver of the truck from damage due to glass breakage. This heavy equipment is not well suited for use in a residential dwelling or a confined space.

U.S. Pat. No. 4,881,866 to Harmon discloses a glass handling apparatus. A sheet handling apparatus is adapted for attachment to a fork lift truck to transport stacks of vertically disposed sheet material from one location to another. The apparatus includes a frame adapted for attachment to the forks of a fork lift truck and a lower support for supporting the lower edges of the sheets. The lower support is adjustably connected to the frame, permitting vertical adjustment of the lower support relative to the frame. The apparatus also includes an upper support pivotally mounted on the frame for engaging the back side of the stack during transport. This glass lifting apparatus is attached to a fork lift truck. It is bulky and cannot be used in a room or confined space. No means are provided to prevent tipping of the lifted load.

U.S. Pat. No. 4,902,187 to Rousseau discloses a drum dolly attachment apparatus. A conventional dolly truck assembly has a drum attachment assembly connected thereto. The drum attachment assembly is slidably mounted on an upright vertical handle of the dolly truck assembly. It is in contact with and grasps a main rim portion of the drum member. The drum attachment assembly is constructed so as to move vertically as required to adjust its position on the main rim portion of the drum member, when moved from a vertical to an inclined position. The drum attachment assembly includes a drum connector assembly having a first stationary drum connector connectable to an upper inner portion of the main rim portion and a second actuator drum connector connectable to an outer lower portion of the main rim portion of the drum member. The actuator drum connector is movable against a bias member to a released position and vertically on the support tube of the dolly truck assembly for use in attaching to another drum member for a subsequent grasping, moving, and transporting operation. This drum dolly is mounted on wheels and grabs a drum which can be tilted for transportation. The device disclosed by the '187 patent does not lift the drum. It is not designed to grab anything other than a cylindrical drum. Accordingly, there is no disclosure or suggestion in the '187 patent concerning a hoisting device for hoisting a flat screen television in a room.

U.S. Pat. No. 5,122,027 to Tabayashi discloses a carrier for a container. A carrier comprises a lift bar provided on the body of the carrier and movable upward and downward, a connecting member pivotably connected between an upwardly driving cylinder device and the lift bar, an upper claw provided on the connecting member, and a lower claw provided on the lift bar and cooperative with the upper claw for holding the upper rim of a container. The load of the container acting on the lower claw pulls down the upper claw for the two claws to clamp the container upper rim to transport the container as lifted. This is a hand truck for lifting a cylinder from the ground for its transportation. The drum is not lifted to any height. Since the drum is outside the wheel base it is subject to tipping. The weight of the heavy drum must be carried by the operator using the handle.

U.S. Pat. No. 5,184,934 to Gallo discloses a gripping device and method of use. A gripping device is used in combination with a front-end loader for lifting and transporting heavy objects. The device comprises a slot-entering jaw means, a second jaw means, a jaw adjusting means to effect movement of one of said slot-entering jaw means and said second jaw means relative to other of said jaw means, and a loader cooperation means by which said device is adapted to cooperate with the loader. The device is particularly useful for removing slabs of concrete from a pre-cut concrete floor, such as found in multi-storey parking garages, during demolition or rehabilitation. This gripping device is attached to a truck and all the lifting is done by the truck. Therefore the gripping device does not suggest a hoisting device for positioning flat screen televisions within the confines of a room.

U.S. Pat. No. 5,501,497 to Holloway discloses an adjustable drum handling carrier. The adjustable drum handling carrier is particularly adapted for use in handling fiber drums. It includes an upright tube with a telescoping top and bottom bracket tubes. The upright tube is attached to a midpoint of a cradle. The side wall of the drum is peripherally engaged by the cradle, and the ends of the drum are engaged by the top and bottom brackets. This drum carrier is removably attached to a drum and has to be lifted by a separate lifting device, the nature of which is not disclosed.

U.S. Pat. No. 5,509,774 to Yoo discloses a load clamping apparatus with an increased extend of vertical movement. A load clamping apparatus is provided for use with a forklift truck including a mast having a vertical guide channel, a lift carriage mounted to the mast for elevational movement there along and a pair of spaced apart forks carried by the lift carriage to support a load to be handled. The load clamping apparatus comprises: a slider member slidably fitted into the vertical guide channel and elevationally movable along the mast, the slider member having a vertical guide groove; a clamp carriage slidably fitted into the vertical guide groove of the slidable member for pressing the load against the pair of spaced apart forks; an actuator pivotally affixed to the mast for causing the slider member to move up and down; upper and lower rotary guide rollers each rotatably mounted to top and bottom ends of the slider member; a first pliable connector having a first end anchored to the mast and a second end fixedly secured to the clamp carriage, the first pliable connector extending upwardly from the first end thereof, turning around the upper rotary guide rollers and then extending downwardly to reach the second end thereof; and a second pliable connector having a first end anchored to the mast and a second end fixedly secured to the clamp carriage, the second pliable connector extending downwardly from the first end thereof, turning around the lower rotary guide rollers and then extending upwardly to reach the second end thereof. This is a fork lift truck with two widely spaced tines and a top clamp plate designed to lift heavy objects. The weight of the heavy object is countered by the weight of the fork lift truck and therefore, its weight is less than or equal to the weight of the fork lift truck. This fork lift truck is not suitable for use in a room to lift a flat screen television to a suitable height.

US Patent Application No. 2005/0045077 to Bober discloses a motorized lift device for facilitating the uninterrupted and nearly noiseless movement of a low-profile television. The motorized lift comprises a base unit having a support unit slidably disposed thereon in a vertically-oriented and telescoping fashion. Support unit movement is controlled via a motor directly coupled to a transmission, which is coupled to a screw. Coupling between screw and an elevator plate converts screw rotation to linear motion within the support unit. A low-friction floating nut between elevator plate and screw, as well as several low-friction couplings between the base unit and the support unit reduce noise and wobbling, eliminate binding, and accommodate for misalignments during movement. The support unit accommodates for vertical and horizontal adjustability during mounting and installation of any size low-profile television. The motorized lift device is not on wheels and cannot be readily moved about. The base of the unit is above ground and cannot reach a heavy flat screen television that is placed on the ground. The base unit protrudes and therefore cannot place a hoisted flat screen television close to a wall.

There remains a need in the art for a hoisting device that would enable a single person to position a flat screen television or other heavy object such as a mirror, large frame picture and the like, reliably on the wall of a room of a residential dwelling.

SUMMARY OF THE INVENTION

The present invention is directed to a hoist system for lifting flat screen TVs and heavy objects including mirrors and heavy picture frames, and which can be operated by a single person to deliver the heavy object at a desired height very close to a wall within a room located in a residential dwelling.

Generally stated, the invention provides a hoisting device mounted on a base that rests on at least four wheels and is integrally connected to a central pillar element. The wheels may be locked in position by a claw like or other locking mechanism. The central pillar element, which is stationary, has a counterweight extension arm that has a handle and a plurality of notches to hang a heavy weight at a specific notch that will balance the weight of the load being lifted. This central pillar element has a movable raising and lowering element, which may be moved up and down by a displacement mechanism. The displacement mechanism may be a lead screw driven by a hand crank or by electrical means or a hydraulic lifting mechanism. This movable raising and lowering element has a projection arm that extends outwardly from the central pillar and is positioned opposite to the counterweight extension arm. The projection arm has a downwardly pointing extension that carries two or four L shaped brackets. When two L shaped brackets are used, they form a line. The four brackets are distributed two on each side in a rectangular configuration so that the distance between the left side L shaped bracket and the right side L shaped bracket can be varied by the user. The movable element may be moved downwards so that the L shaped brackets may rest on the ground level or may be raised to a significant height by the upward displacement of the movable raising and lowering element. The extension of the projection arm has sufficient length so that the L shaped brackets contact the ground outside the wheel supported base. The movable element is also provided with a second adjustable length arm that carries a vertical support for the lifted object on its top portion. In addition, a polypropylene belt may be used to secure the lifted object against the movable arm.

In use, the user lowers the movable raising and lowering arm until the L shaped brackets are at the ground level. The wheels of the base are used to direct the hoisting system so that the flat screen TV or heavy object is between the two left side L shaped brackets and two right side L shaped brackets in the four L shaped bracket arrangement. The flat screen TV or heavy object is slightly rocked to left side and the two left side L shaped brackets are slid under the flat screen TV or heavy object. Next the flat screen TV or heavy object is rocked to the right slid and the two right side L shaped brackets are slid under the flat screen TV or heavy object. Now the entire weight of the flat screen TV or heavy object rests on four L shaped brackets. When only two L shaped brackets are used, they are slid under the heavy weight object in a similar manner. The vertical support on the second projection arm is lowered to secure the flat screen television or heavy weight. Additionally, the flat screen television or heavy weight may be secured by a polypropylene belt attached to the downwards pointing extension. The movable raising and lowering arm is now moved upwards slightly to estimate the tipping tendency of the heavy load being lifted. The heavy counterbalance weight supplied is hung on one of the notches in the counterbalance extension arm balancing the tipping tendency of the heavy load. The handle in the counterbalance extension may be used to fine-tune the balance of the lifted weight. Now the lifted balanced load is wheeled to a desired location. Since the lifted load is cantilevered on the projection arm, the lifted load may be brought very close to wall. It is then raised to a desired level. In the case of a flat screen TV, it may be raised to a height clearing a lip of a wall bracket first and is then wheeled very close to the wall and lowered slowly to drop the flat screen TV onto the wall bracket. At this point, the counterweight is removed and the two or four L shaped brackets are withdrawn from their supporting position at the bottom of the flat screen TV. The vertical support on the second projecting arm and the polypropylene belt are released from the load that is lifted. In a similar manner, a bottom support of a swinging wall flat screen TV support may be attached to the lifted flat screen TV. Since the L shaped brackets only support the flat screen TV on the corners, the entire bottom portion of the flat screen TV is available for attachment to the bottom support of the swinging wall support. The lifted flat screen TV is gently lowered on to the bottom support of the swinging wall support and the attachment bolts are tightened. Since the wheels at the bottom of the base are provided with locking claws the hoisting assembly may be locked at any desired location to prevent unforeseen movement that may cause misalignment between the bolt holes and bolts. This entire operation is easily handled by a single person due to the ease of use of the hoisting system and its ability to precisely position lifted heavy objects.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Figure 1:
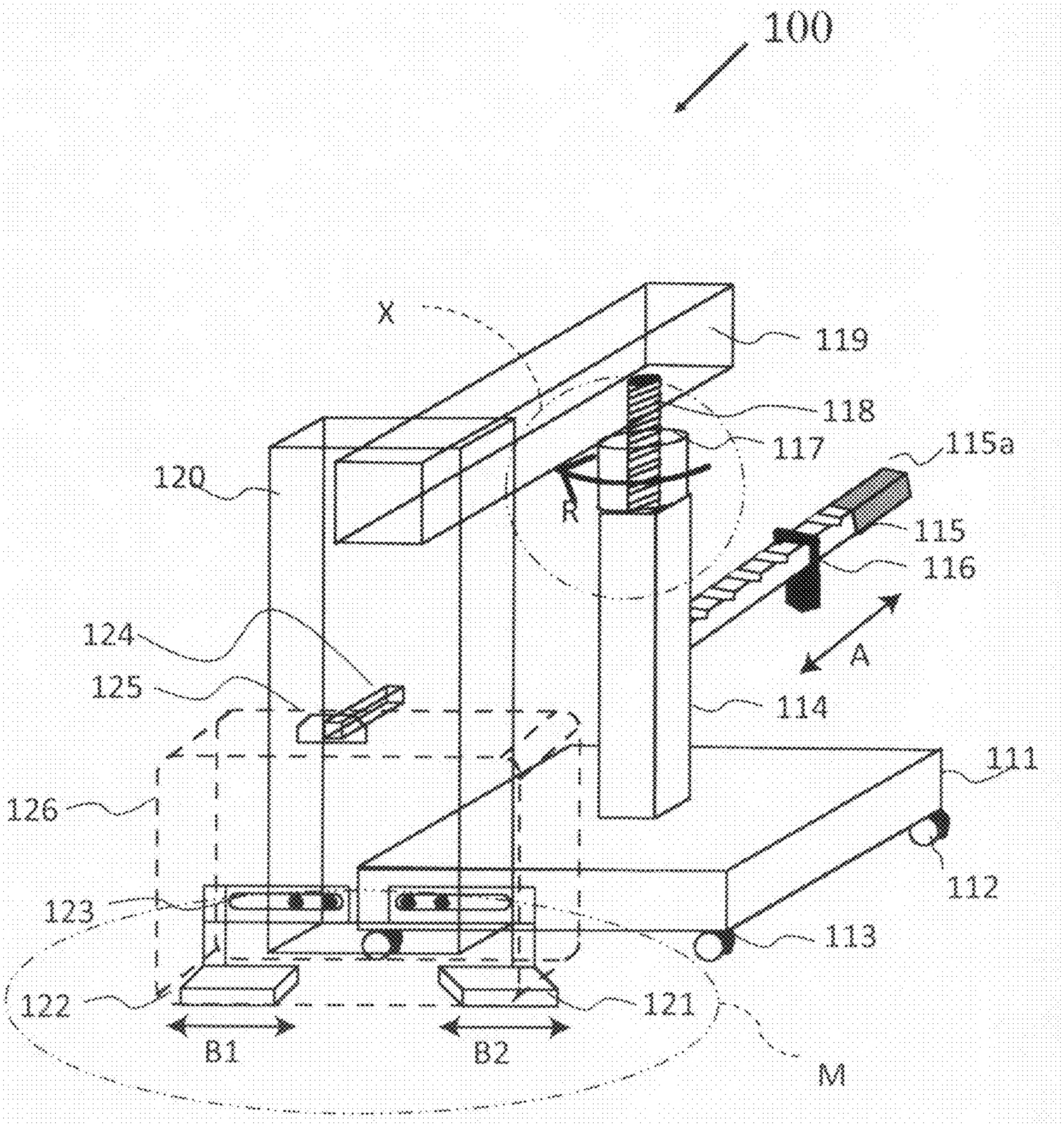
FIG. 1 is a schematic view of the hoisting system for flat screen television or heavy weight objects usable within a room of a residential dwelling.

The present invention provides a hoist system for flat screen TVs and lifting heavy objects including mirrors and heavy picture frames. Advantageously, the system delivers a heavy object at a desired height very close to a room wall of a residential dwelling. The lifted object is held steady at the delivery point, thereby enabling a single person to safely and easily mount the heavy lifted object on the wall. It has been very difficult so far to lift a heavy object in close proximity to a wall, since the heavy weight of a cantilevered heavy object by a lifting mechanism results in tipping of the heavy weight and, in the some cases, can cause the lifted heavy weight to drop inadvertently.

Generally stated, the invention provides a hoisting device mounted on a base that rests on at least four wheels that is integrally connected to a central pillar element. The central pillar element, which is stationary, has a counterweight extension arm extending from one side of the central pillar at a pre-selected height. The extension arm terminates in a handle and has a plurality of notches spaced apart from each other. A heavy weight is provided, which may be hung from one of these notches to balance the weight of the load that is being lifted. This central pillar element may be hollow and has a movable raising and lowering element, which may be moved up and down by a displacement mechanism. The displacement mechanism may be a lead screw driven by a hand crank or by an electrical motor with suitable speed controls or a hydraulic lifting mechanism. This movable raising and lowering element has a projection arm that extends outwards from the central pillar and is positioned in a location that opposes counterweight extension arm. The projection arm has a downwards pointing fixed extension that carries in the first embodiment four L shaped brackets. These four brackets are placed apart from each other, forming a rectangular configuration, wherein the longer length of the rectangle is adjustable and is settable to equal to the length of the bottom edge of a flat screen TV or a heavy weight. In the case of the first embodiment, the two L shaped brackets are arranged with one set on the right side and one set on the left side, so that the distance between these sets of L shaped brackets is adjustable by the user. In the second embodiment only two L shaped brackets are used, one on the left side and one on the right side. The movable raising and lowering element may be moved downwards so that the L shaped brackets rest at the ground level or are raised to a significant height by the upward displacement of the movable raising and lowering element of the hoisting system. The extension of the projection arm has sufficient length so that the L shaped brackets fall outside the wheel supported base when the L shaped brackets are lowered close to ground. As a result of this feature, the hoisting system L shaped brackets may be wheeled in close proximity to a wall while carrying a heavy load. The movable raising and lowering element is also provided with a second adjustable length arm that carries a vertical support for the lifted object. This vertical support may be used to support the top portion of a flat screen TV or a heavy object while it is being lifted. The vertical support moves at the same time as the L shaped brackets when the movable raising and lowering element is raised or lowered, thereby completely supporting the heavy load lifted to prevent its unforeseen displacement. In addition, a polypropylene belt secured to the downward pointing extension may be used to secure the lifted object, providing additional stability.

The movable arm carries in the first embodiment four L shaped brackets, two of which may be slid under the left side and two of which may be slid under the right side of a television or a heavy object resting at the ground level. The four L shaped brackets are slightly outside the location of the front wheels of the base of the hoist device, when the raising and lowering element is lowered. The L shaped brackets are displaced and locked under the television or heavy object completely supporting the television or the heavy object. In the second embodiment, only two L shaped brackets are provided, one supporting the heavy weight lifted on the left side and one secured on the right side. The flat screen television or heavy object may be secured by an adjustable polypropylene belt that is attached to the downward pointing extension of the hoisting device. Additionally an adjustable vertical support attached to the moveable arm may be used to secure the top portion of the flat screen television. Thus, when the television or heavy object is lifted using the displacement mechanism, the lifted object extends beyond the front wheels provided at the base of the hoisting device. Clearly, the center of gravity of the television or heavy weight together with the hoisting device falls outside the supporting wheels at the base of the hoisting device, which could tend to cause tipping of the lifted television or heavy weight. In order to combat this tipping behavior, a counterweight arm extends from the central stationary pillar on the opposite side to the L shaped brackets. The counterweight arm is provided with a plurality of notches for hanging a heavy weight counterweight. The arm can further be supported by the user's hand at any time, preventing a tipping movement. Depending on the weight of the flat screen television or heavy weight, the counterweight is hung at a selected notch to prevent tipping of the flat screen television or heavy weight. Once this tipping behavior of the lifting object is stabilized, it may be lifted to any height safely and lowered gently on a wall bracket or an extendable support arm of a television stand that is attached to the wall. Since the lifted object hangs outside the supporting wheels, the lifted object may be readily positioned very close to a wall. If necessary, the wheels may be locked to prevent any movement of the hoisted object. Thus an entire operation that comprises lifting and hanging of a flat screen television can be safely accomplished by a single person. The device may also be used to precisely position and safely hang heavy pictures or mirrors on a wall.

The base of the hoisting device is a platform provided with at least four wheels that are mounted on swivels. Each of the wheels has a claw like device that may be pressed to lock the base at any given location to prevent further movement thereof. In general, it is not necessary to lock all the wheels to prevent further movement of the base. The center of the base has a cylindrical or rectangular column extending vertically from the base. The interior of this column is hollow to accommodate a screw, which is preferably a square threaded screw. The portion of the column distal from the base has an attached end member. The end member has a central aperture, which has internal threads that match the screw thread pattern of the screw member. Thus when the end member is rotated, the square threaded screw raises or lowers. This end member may be turned by a hand crank handle or an electrical motor drive. Other displacement mechanisms other than a screw drive may be used including a hydraulic lift mechanism.

Figure 3:
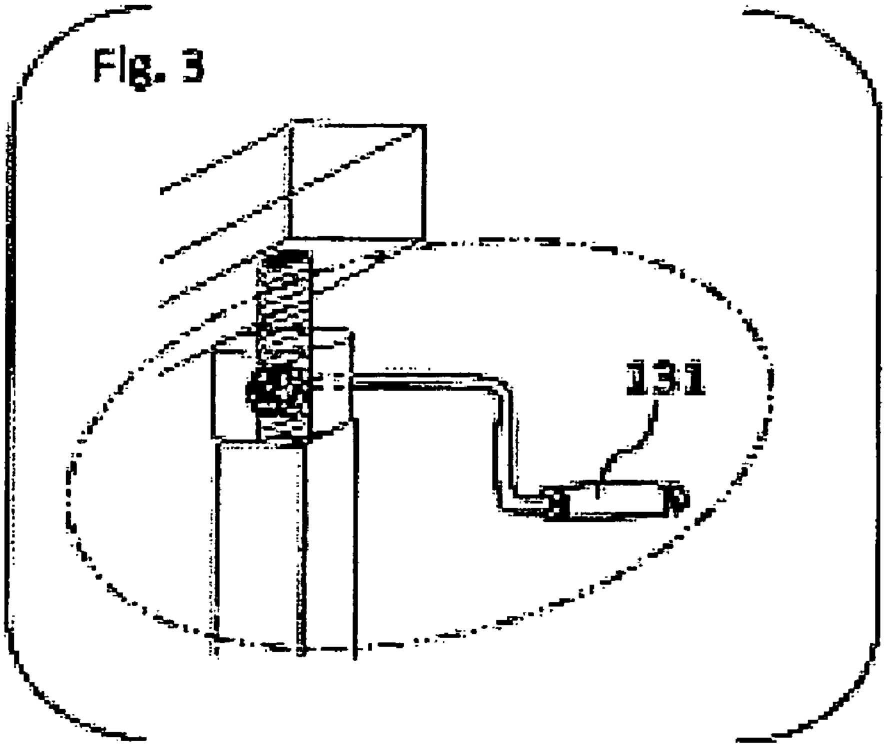
FIG. 3 illustrates the optional hand crank driven screw drive taken from cross-region X of FIG. 1.
Figure 4:
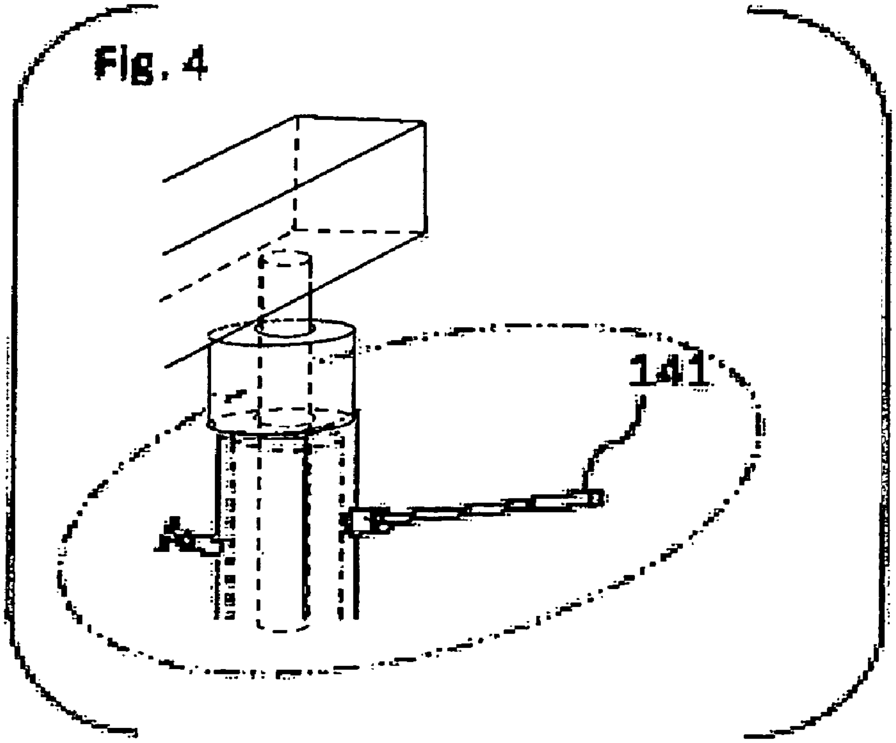
FIG. 4 illustrates the optional hydraulic lift mechanism taken from cross-region X of FIG. 1.

FIG. 1 schematically illustrates generally at 100 the hoisting system for flat screen television or heavy objects. In this figure, reference numeral 111 is the base of the hoist support system, which is shown to be supported by four wheels 112, each of which is individually lockable by claw like clamp 113. The central pillar 114, which is hollow, is permanently connected to the base 111. The stationary pillar 114 has on one side a counter weight extension 115, which has a plurality of notches wherein a pre-selected weight may be hung to balance the weight of the load being hoisted by the hoist system. As the weight is displaced away from the central pillar 114, as shown by the arrow 'A", a larger weight lifted may be counterbalanced. A handle portion of the counter weight balancing extension 115*a* is also shown. At the distal end of the central pillar 114 from the attachment point to the base 111, there is an end member 117, which has a central aperture that is threaded and carries a movable raising and lowering element 118, which in this case is a threaded lead screw. Rotation of the end member in the direction of arrow 'R" raises the movable element 118. Preferably, the threads used are square threads providing a higher load carrying capacity. The end member 117 may be turned by a hand crank (as illustrated in FIG. 3 at 131 taken along cross-region X of FIG. 1), hydraulic lift mechanism (as illustrated in FIG. 4 at 141 taken along cross-region X of FIG. 1) or by an electrical motor (not shown). The movable raising and lowering element is connected to a projection arm 119 that extends away from the central pillar 114 and is located in a direction opposite to the counter weight arm 115. The downward projecting extension 120 is connected to the distal end of the projection arm. The projection arm 119 has sufficient length so that upon displacement of movable raising and lowering element 118, the downward projecting extension 129 is lowered to ground level beyond the base 111 as shown. The downward projecting extension 120 has four length-adjustable L shaped brackets, two on the left side, 121 and two on the right side, 122. The drawing shows only two brackets according to the second embodiment. Left bracket 121 is first slid under a flat screen television of a heavy object by gently tiling and moving the left side bracket along arrow 'B1'. Next the right side bracket 122 is slid under the flat screen television or heavy object by displacing the right side bracket along arrow 'B2'. The flat screen television shown in phantom 126 is now supported by the hoisting system. The top support 124 is then brought down and secured with clamp 125 against the upper surface of the flat screen television or heavy object. Additionally, a polypropylene belt (not shown) attached to the downward projecting extension 120 may be used to secure the flat screen television. Now the movable raising and lowering element 118 is raised to estimate the balance of the weight being lifted. The user may support the load by applying hand pressure to the distal end of the counterweight extension 115, and locate and hang the counterweight at an appropriate location to balance the lifted weight. Now the hosting system may be reeled to any desired location and locked securely by using wheel clamps 113. Since the hoisted load extends beyond the base of the hoisting system, it may be brought close to a wall in a room and lifted to a desired height due to the fact that the load hoisted is completely balanced and is immune to tipping. It may be gently lowered onto a wall mounted stationary bracket or a wall mounted swinging bracket. The "lowering action" can be accomplished reliably and the bolts can be attached by a single person. Now that the weight of the flat screen television or heavy object is supported by wall supported brackets, the L shaped brackets are first withdrawn and the weight is simply displaced to a notch very close to the central pillar 114.

Figure 2:
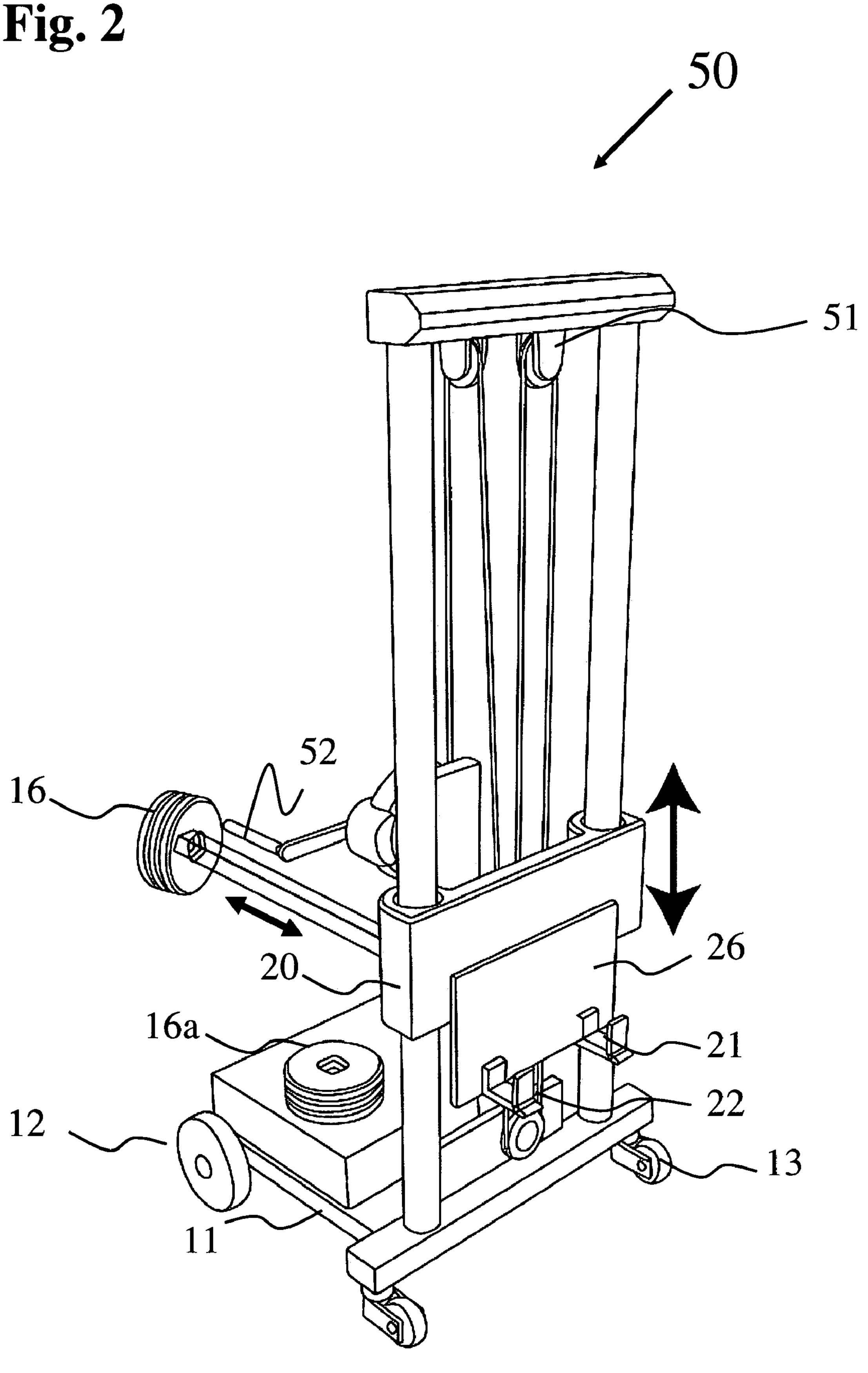
FIG. 2 is a schematic view of an alternate embodiment of the hoisting system for flat screen television or heavy weight objects usable within a room of a residential dwelling using a pulley lifting mechanism.

FIG. 2 schematically illustrates at 50 an alternate embodiment of the hoisting system for flat screen television or heavy objects using a pulley lifting mechanism 51 instead of a screw drive. When handle 52 is turned, the lifted flat screen television (not shown) moves up and down as shown by the arrow. Weights 16 are hung on the counterweight extension 15 as shown to balance the weight of the lifted flat screen television. Additional weights are shown at 16*a*. All components that are common to FIG. 1 are numbered with identical indicia.

In this figure, reference numeral 11 is the base of the hoist support system, which is shown to be supported by four wheels 12, each of which is individually lockable by claw like clamp 13. The central pillar 14, which is hollow, is permanently connected to the base 11. The stationary pillar 14 has on one side a counter weight extension 15, which has a plurality of notches wherein a pre-selected weight may be hung to balance the weight of the load being hoisted by the hoist system. As the weight is displaced away from the central pillar 14, as shown by the arrow 'A", a larger weight lifted may be counterbalanced. A handle portion of the counter weight balancing extension 15*a* is also shown. At the distal end of the central pillar 14 from the attachment point to the base 11, there is an end member 17, which has a central aperture that is threaded and carries a movable raising and lowering element 18, which in this case is a threaded lead screw. Rotation of the end member in the direction of arrow 'R" raises the movable element 18. Preferably, the threads used are square threads providing a higher load carrying capacity. The end member 17 may be turned by a hand crank (not shown) or by an electrical motor (not shown). The movable raising and lowering element is connected to a projection arm 19 that extends away from the central pillar 14 and is located in a direction opposite to the counter weight arm 15. The downward projecting extension 20 is connected to the distal end of the projection arm. The projection arm 19 has sufficient length so that upon displacement of movable raising and lowering element 18, the downward projecting extension 29 is lowered to ground level beyond the base 11 as shown. The downward projecting extension 20 has four length-adjustable L shaped brackets, two on the left side, 21 and two on the right side, 22. The drawing shows only two brackets according to the second embodiment. Left bracket 21 is first slid under a flat screen television of a heavy object by gently tiling and moving the left side bracket along arrow 'B1'. Next the right side bracket 22 is slid under the flat screen television or heavy object by displacing the right side bracket along arrow 'B2'. The flat screen television shown in phantom 26 is now supported by the hoisting system. The top support 24 is then brought down and secured with clamp 25 against the upper surface of the flat screen television or heavy object. Additionally, a polypropylene belt (not shown) attached to the downward projecting extension 20 may be used to secure the flat screen television. Now the movable raising and lowering element 18 is raised to estimate the balance of the weight being lifted. The user may support the load by applying hand pressure to the distal end of the counterweight extension 15, and locate and hang the counterweight at an appropriate location to balance the lifted weight. Now the hosting system may be reeled to any desired location and locked securely by using wheel clamps 13. Since the hoisted load extends beyond the base of the hoisting system, it may be brought close to a wall in a room and lifted to a desired height due to the fact that the load hoisted is completely balanced and is immune to tipping. It may be gently lowered onto a wall mounted stationary bracket or a wall mounted swinging bracket. The "lowering action" can be accomplished reliably and the bolts can be attached by a single person. Now that the weight of the flat screen television or heavy object is supported by wall supported brackets, the L shaped brackets are first withdrawn and the weight is simply displaced to a notch very close to the central pillar 14.

The hoist system for flat screen television and heavy objects comprises, in combination, the following salient features:

1. a base supported by at least four wheels with at least one of said wheels having a locking claw;
2. said base connected integrally to a stationary central pillar element;
3. said central pillar element having a counterweight extension arm with a handle at the distal end and a plurality of spaced notches for receiving a counter weight;
4. said central pillar having a movable raising and lowering element, movable by a displacement mechanism;
5. said displacement mechanism being a screw drive driven by a hand crank or electric motor drive or a hydraulic lift mechanism;
6. said movable raising and lowering element having a projection arm extending outward from said central pillar and located on the opposite side to said counterweight extension arm;
7. said projection arm having a downward pointing extension carrying four or two L shaped brackets;
8. said four L shaped brackets being arranged in a rectangular configuration and said two L shaped brackets being disposed in a line;
9. said rectangular configuration of four L shaped brackets or two L shaped brackets being in a line being adjustable by the user to the length of a lifted flat screen television or heavy weight;
10. optionally said downward pointing extension is provided with a second projection arm carrying a vertical support for the lifted flat screen television or heavy load; and
11. optionally said downward pointing extension is provided with a polypropylene belt for securing the lifted flat screen television or heavy load;

whereby said L shaped brackets are slipped below the bottom of the flat screen television or heavy weight, gently lifted to determine the tipping tendency of the load and balanced by a counter weight added at an appropriate notch in the counterweight extension arm;

whereby the lifted weight balanced flat screen television or heavy weight is wheeled to a desired location, including a location in very close proximity with a room wall, lifted to a desired height and attached using wall attachment means.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A hoist system for hoisting a flat screen television or heavy object in a room or an enclosed space, comprising:

a. base supported by at least four wheels at least one of said wheels having a locking means, said base having a center;

b. said center of said base being integrally connected to a stationary central pillar element;

c. a plurality of counter weights;

d. said central pillar element having a counterweight extension arm that terminates into a handle at its distal end and has a plurality of spaced notches extending from said central pillar element to said handle for receiving at least one counter weight selected and placed within said notches based on a weight of said flat screen television or heavy object appointed to be hoisted;

e. said central pillar having a distal end with an end member, said end member having a raising and lowering element, movable by a displacement means, and wherein said counterweight extension arm is connected to said stationary central pillar at a point below said distal end with said end member;

f. said raising and lowering element having a projection arm extending outward in relation to said central pillar and located on the opposite side to and above said counterweight extension arm;

g. said projection arm having a downward pointing extension carrying plurality of length adjustable L shaped brackets, wherein said flat screen TV or heavy object is appointed to entirely rest on and be in physical contact with said adjustable L shaped brackets;

whereby said L shaped brackets are appointed to be slipped below the bottom of the flat screen television or heavy weight, gently lifted to determine tipping tendency of the load and balanced by a counter weight appointed to be added at an appropriate notch in the counterweight extension arm, the lifted weight balanced flat screen television or heavy weight is appointed to be wheeled to desired location including a local closely proximate to a room wall, lifted to a desired height and attached using a wall attachment means.

2. A hoist system as recited by claim 1, wherein said raising and lowering element displacement means comprises a screw drive.

3. A hoist system as recited by claim 2, wherein said screw drive is turned by a hand crank.

4. A hoist system as recited by claim 2, wherein said screw drive is turned by an electric motor drive.

5. A hoist system as recited by claim 1, wherein said raising and lowering element displacement means comprises a hydraulic lift mechanism.

6. A hoist system as recited by claim 1, wherein said downward pointing extension has two adjustable length L shaped brackets one on each side at the bottom along a line.

7. A hoist system as recited by claim 1, wherein said downward pointing extension has an adjustable polypropylene belt attached.

8. A hoist system as recited by claim 1, wherein said downward pointing extension is provided with a second projection arm carrying an adjustable vertical support for the lifted object.

* * * * *